Sept. 6, 1932. W. B. GREEN 1,875,591
COMBINATION GATE AND REVERSIBLE CHECK VALVE
Filed Jan. 16, 1931 2 Sheets-Sheet 1

Inventor
William B. Green
By Adam E. Fisher
Attorney

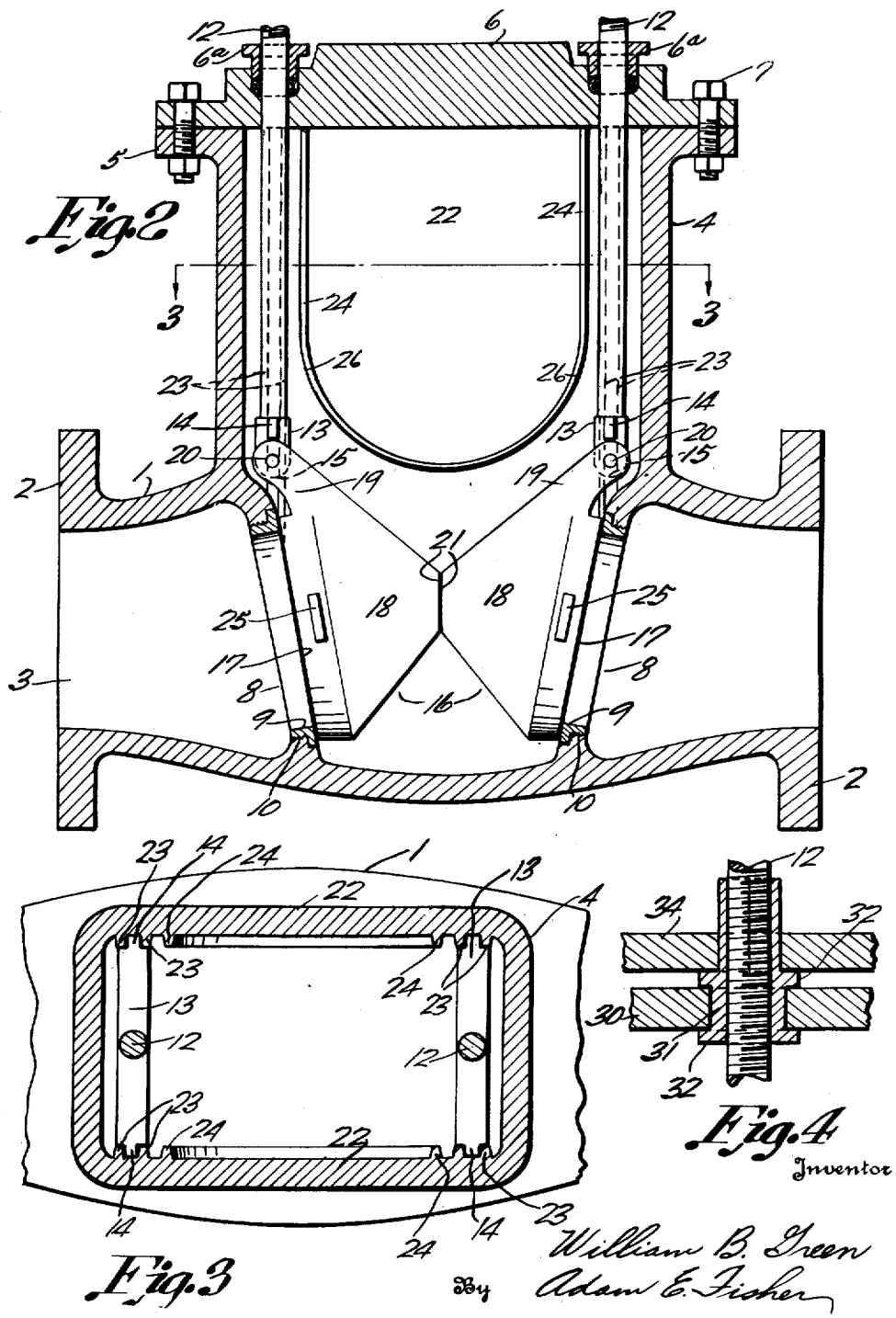

Patented Sept. 6, 1932

1,875,591

UNITED STATES PATENT OFFICE

WILLIAM B. GREEN, OF EAST ST. LOUIS, ILLINOIS

COMBINATION GATE AND REVERSIBLE CHECK VALVE

Application filed January 16, 1931. Serial No. 509,168.

This invention relates to valves of the type used to control the flow of liquid through a pipe or the like.

The main object of the invention is to provide a valve combining the functions of a gate valve for stopping the flow of a liquid and a check valve for permitting the flow of the liquid in one direction only.

Another object is to provide a valve of the above character which may be adjusted to permit the flow of the liquid in either direction and prevent or check the flow in the other direction.

Another object is to provide a valve of the character described in a simple, efficient and readily operable form.

With these and other objects in view the invention resides in the novel construction and arrangement of parts as hereinafter set forth and claimed, reference being had to the accompanying drawings wherein:

Figure 2 is an enlarged longitudinal section through the valve, not showing the valve operating means and showing the valve in use as a gate valve.

Figure 3 is a horizontal cross section along the line 3—3 in Figure 2.

Figure 4 is an enlarged sectional detail view of one of the valve operating stems and its raising and lowering means.

Figure 1:
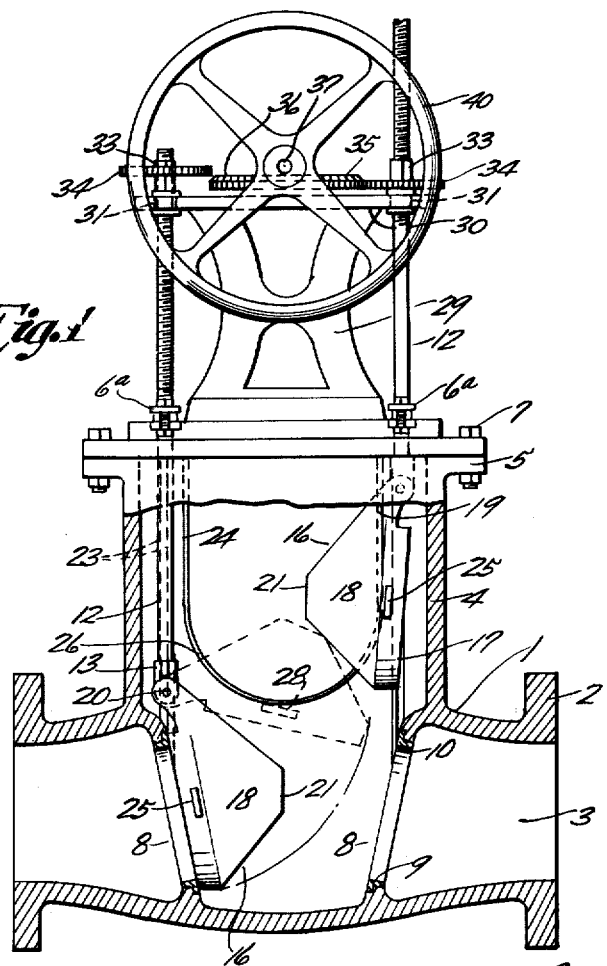
Figure 1 is a longitudinal section through the valve, in use as a check valve, showing also in elevation the operating means for the valve mechanism.
Figure 5:
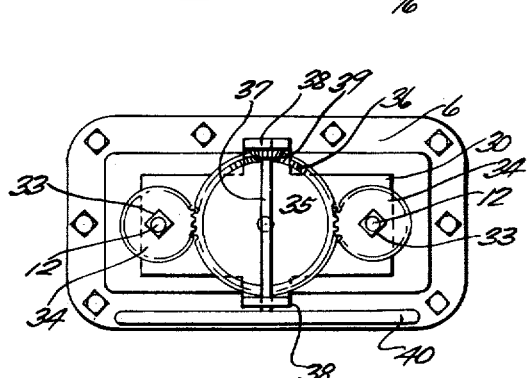
Figure 5 is a plan view of the valve operating means as shown in Figure 1.
Figure 6:
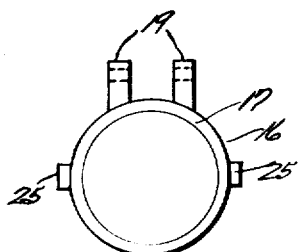
Figure 6 is a detached detail elevation of one of the valve disks.

Referring now more particularly to the drawings the reference numeral 1 designates the housing or body having the two end flanges 2 and the passage 3 for the water or other liquid. A head or upper chamber 4 is provided on the body 1 and both the head and body are cast integrally in the usual manner and are hollow as shown permitting the mounting therein of the various valve elements to be described. The head 4 has a bonnet flange 5 around its upper margin to which the bonnet or cap 6 is secured by the bolts 7. Opposed valve seats 8 are provided in the body 1 and the same are disposed at equal distances from the vertical axis of the valve as a whole. These seats 8 are set at an angle to the vertical and converge from their upper to their lower extremities, being what is generally termed "tapered". The seats are conventionally formed of rings 9 threaded at 10 in the body 1 whereby they may be replaced when worn. The head 4 and bonnet 6 are preferably though not necessarily generally rectangular in plan as shown and threaded valve stems or spindles 12 are slidably mounted through glands 6a in the bonnet 6 and extended vertically downward through the head 4 near its ends. Valve hangers 13 are secured to the lower ends of the stems 12 and are disposed laterally in the head 4 in parallelism with the ends thereof. These hangers 13 have the laterally projecting lugs 14 and the depended apertured ears 15 for a purpose to be described. A pair of what is generally termed and hereinafter referred to as valves or valve disks 16 is provided, each having a circular flat seating face 17 and the tapered back 18 in the form of a truncated cone. Spaced apertured hanger arms or ears 19 are extended from each valve or valve disk 16 and the valves or disks are hinged to the ears 15 on the hangers 13 by these arms, hinge pins 20 being passed through the ears and arms in conventional manner for this purpose. The back 18 of each valve disk 16 has a flat wedging and locking face 21 for a purpose to be described and attention is called to the fact that both of these faces 21 are cut at the same angle relative to the seating faces 17 of the valves and so rest in a vertical plane when the valves are lowered. The valve disks 16 are so proportioned and the seats 8 are so set in the body 1 that when the valve disks are both lowered together as shown in Figure 2 the flat seating faces 17 thereof will be pressed tightly against the valve seats and the wedging and locking faces 21 of the valves will be in engagement to hold the said disks to their seats. Due to the "tapered" arrangement of the seats 8 the disks 16 may be wedged into place as will be understood.

Both disks may be raised and lowered together thus acting as a gate valve, or as shown in Figure 1 one disk may be raised up into the head 4 and the remaining disk will then act as a check valve, allowing the flow of liquid through the body 1 in one direction and checking the flow in the opposite direction. It will be readily apparent that by virtue of the aforesaid cutting of the wedging faces 21 to lie in a vertical plane, either of the valve disks 16 may be used as a check valve so that the liquid may be allowed to flow in either direction at will.

The sides 22 of the head 4 have vertical, laterally aligned hanger guide ribs 23 formed thereon adjacent each end for the reception therebetween of the hereinbefore mentioned lugs 14 on the hangers 13, the hangers and the valve stems 12 being thus steadied during their raising and lowering in the operation of the disks 16 as described. Inwardly of the ribs 23 are additional disk guide ribs 24 and the valve disks 16 carry laterally projecting lugs 25 adapted to slide in the grooves formed between these ribs 24 and the innermost ribs 23 as the disks are raised into the head 4 whereby to prevent any play in the disks. As shown at 26 in Figures 1 and 2 the ribs 24 of each side 22 are extended or curved inwardly and merged together as they extend downward toward the body 1. This construction provides a stop for the disk as it is swung upward by the flow of liquid through the body 1, the lugs 25 on the disk striking the curved portions 26 of the ribs 24 on the sides 22 as shown in the dotted lines 28 in Figure 1. This curving and connection of the ribs 24 also allows the valve disks 16 to swing away from the seats 8 as they are raised thus preventing unnecessary wear upon the seats which would otherwise be caused by the disks scraping across the seats.

Figures 1 and 4 illustrate a means for raising and lowering the valve disks 16 which comprises a yoke or stand 29 secured on top of the bonnet 6 the said stand having the top plate 30. Yoke nuts 31 are journaled in the plate 30 near its ends and are threaded on the threaded valve stems 12 as shown. These yoke nuts 31 are of conventional form and are secured against axial displacement in the plate 30 by the spool like flanges 32. Above the uppermost of the flanges 32 the yoke nuts 31 are cut square or hexagonal in cross section or are provided with keyways as shown at 33 and operating spur gears 34 are slidably but not rotatably mounted on these square ends. A center drive gear 35 is journaled horizontally on the plate 30 between and in mesh with the gears 34, the said gear 35 having also beveled gear teeth 36 around its upper margin. An axle 37 is journaled laterally and horizontally across the plate 30 above the gear 35 and in bearings 38 extended from said plate 30. A beveled pinion 39 is secured to the axle 37 adjacent one end and in mesh with the teeth 36 of the driving gear 35 and a hand wheel 40 is secured to the opposite end of the axle.

It will now be understood that a rotation of the hand wheel 40 will rotate the gears 34 and the yoke nuts 31 and the rotation of these yoke nuts which are threaded on the stems 12 will raise or lower the stems and the valve disks 16. The valve may thus be opened or closed by rotation of the hand wheel 40 in the proper direction. When it is desired to raise only one of the valve disks 16, the other gear 34 is pulled upward on the square end 33 of the yoke nut 31 out of mesh with the drive gear 35 as shown in Figure 1. Only the gear 34 above the valve disk to be raised is then turned by the drive gear 35 and thus it is possible to raise or lower either valve disk independently of the other. The gears 34 may be raised by any suitable or desired means. It is understood that the above operating mechanism for the valve disks is only one of the many which might be used for the purpose and any other form may be used as desired.

From the foregoing it will be apparent that I have combined in a single, simple valve the operations of both a gate and check valve and in addition have provided a valve which is reversible in its action as a check valve. It is the conventional practice to use both a gate and a check valve in a pipe or line carrying a liquid to and from pumps, tanks or the like and the use of my invention will thus combine these two necessary valves. Beyond combining the two valves in a single valve, the present invention further provides a valve which will entirely open the pipe or line to the flow of liquid freely in either direction which action is not possible with the use of separate gate and check valves. Further advantages will be apparent to those skilled in the art.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a device of the kind described, a housing, an upwardly extended head chamber thereon, opposed spaced valve seats in the housing, the said seats converging downwardly, hangers slidably mounted in the head chamber above the valve seats, valves hinged at their upper margins to the said hangers and adapted to be raised and lowered between the valve seats thereby, the said valves comprising flat outer faces adapted to engage the said valve seats, and cone-shaped backs terminating in flat wedging faces adapted for engagement to hold the said valves apart and to the valve seats, the said wedging faces being arranged to lie in a vertical plane when the valves are lowered.

2. In a device of the kind described, a housing, an upwardly extended head thereon, a cap upon the head, spaced vertically extended ribs on the inner side of the head, opposed and spaced annular valve seats in the said housing, the said valve seats converging downwardly, hangers slidably mounted between the said ribs on the head, threaded valve operating stems secured vertically to the hangers and slidably mounted through the cap, valves hinged by their upper margins to the said hangers, the said valves including back portions having flat wedging faces adapted for contact to hold the said valves apart and to the valve seats.

3. In a device of the kind described, a housing, an upwardly extended head thereon, a cap on the said head, opposed and spaced annular valve seats in the housing, the said valve seats converging downwardly, hangers slidably mounted in the head, spaced vertical hanger guide ribs on the inside of the head for the reception therebetween of the ends of the hangers, threaded valve operating stems secured vertically on the hangers and slidably passed through the said cap, valves hinged by their upper margins to the said hangers, the said valves comprising circular flat seating faces and conical back portions terminating in flat wedging faces adapted to hold the said seating faces in contact with the valve seats, vertically extended valve guide ribs on the inner sides of the head inwardly of the first mentioned ribs the said ribs being connected at their lower ends, and lugs laterally extended from the said valve and adapted to engage the said ribs on the head.

4. In a device of the kind described, a housing, opposed downwardly converging valve seats in the housing, valves arranged for vertical movement in the housing downward over the said valve seats, and the said valves having flat vertically cut wedging faces on their backs adapted to engagement to press the valves apart and against the valve seats.

In testimony whereof I affix my signature.

WILLIAM B. GREEN.